3,463,810
Patented Aug. 26, 1969

3,463,810
METHOD FOR SELECTIVE REDUCTION OF α,β-ETHYLENICALLY UNSATURATED CARBONYL COMPOUNDS
Sudarshan K. Malhotra, Northboro, Douglas F. Moakley, Framingham, and Francis Johnson, Newton Lower Falls, Mass., assignors to The Dow Chemical Company, Midland, Mich., a corporation of Delaware
No Drawing. Filed Jan. 23, 1967, Ser. No. 610,792
Int. Cl. C07c 45/00, 119/08
U.S. Cl. 260—534                                    14 Claims

ABSTRACT OF THE DISCLOSURE

Selective reduction of α,β-ethylenic bond in α,β-ethylenically unsaturated carbonyl compounds by conversion to Schiff base with primary amine, followed by catalytic rearrangement and subsequent hydrolysis.

BACKGROUND OF THE INVENTION

This invention relates to a method for selective reduction of α,β-ethylenically unsaturated carbonyl compounds. The term "carbonyl" in this specification is used to identify both ketone and aldehyde groups.

It has been attempted to reduce the ethylenic double bonds in carbonyl compounds for example by catalytic hydrogenation or with sodium in liquid ammonia. The catalytic reductions, however, result in a reduction of all ethylenic double bonds present in the particular compound and moreover are accompanied by reduction of the carbonyl group to an alcoholic group or even the hydrocarbon. In addition such reductions are not stereospecific.

SUMMARY OF THE INVENTION

It has now been found that selective reduction of only the ethylenic bond which stands in conjugation with the carbonyl group can be obtained by the method according to the present invention.

The present invention provides a method for selective reduction of the ethylenic double bond in α,β-ethylenically unsaturated carbonyl compounds by conversion with a primary amine to form a Schiff base, followed by isolation and rearrangement of the Schiff base in the presence of an organic alkaline catalyst and subsequent hydrolysis in an acidic medium. The method applies in general to compounds comprising the group

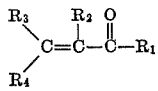

in which $R_1$, $R_2$, $R_3$ and $R_4$ represent hydrogen, or aliphatic hydrocarbon group, whereby $R_3$ and $R_4$ may join to form a 6 membered carbon ring and $R_1$ may join with either $R_3$ or $R_4$ to form a 6-membered carbon ring. The compounds may contain additional ethylenic double bonds isolated from or in conjugation with those present in the above group.

The method is effective for any ketone and aldehyde having the above defined typical configuration belonging to the general classes of aliphatic, aromatic, and cycloaliphatic ketones and aldehydes. Ketones and aldehydes of the type defined above are, for example, d-carvone, testosterone, 2-cyclohexenone and derivatives thereof such as 3-methyl-2-cyclohexenone and 2,4-dimethyl-2-cyclohexenone, $\Delta^{1(9)}$-2-octalone, 10-methyl-$\Delta^{1(9)}$-2-octalone, mesityl oxide, citral and crotonaldehyde.

The isolation of the Schiff base prior to the second stage of rearrangement and hydrolysis is essential since even small amounts of the amine inhibit the second part of reaction.

It is also important that the second stage is carried out in an inert atmosphere, preferably nitrogen. The presence in the atmosphere of, for example, carbon dioxide, oxygen or water will interfere with the reaction in the second stage.

For the preparation, any conventional primary amine can be used which induces electronegativity at the carbon atom adjacent to the amine group. Though benzylamine is the easiest accessible amine, other arylmethyl amines such as, for example, p-nitrobenzylamine and diphenylmethylamine, or α-carboxyl amines, such as glycine, alanine, valine, methionine and leucine can be used.

The first stage of the reaction, the formation of the Schiff base (I) is assumed to have the following reaction scheme (illustrated for benzylamine and $\Delta^2$-cyclohexenone):

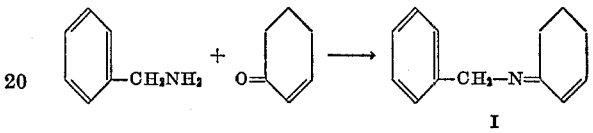

After isolating the Schiff base, thus formed, this product is brought in contact in the liquid phase with an organic alkaline catalyst such as an alkali metal alkoxide, for example, potassium tert-butoxide, sodium methoxide and sodium ethoxide.

This second stage of the reaction is assumed to have the following reaction scheme (starting from the Schiff base shown above)

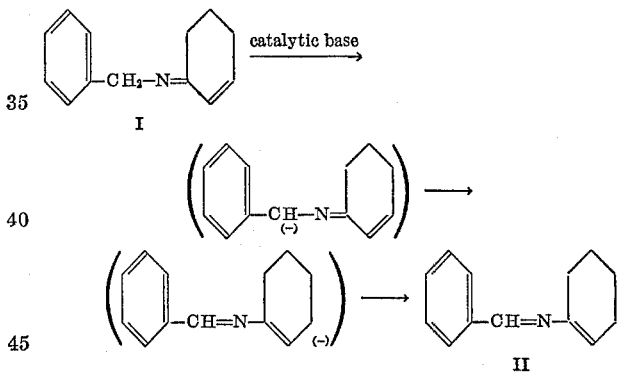

If the Schiff base concerned is liquid under the prevailing reaction conditions, no solvent is required; otherwise an inert solvent is desirable. Suitable solvents are for example dimethylsulfoxide, the dimethyl ether of ethylene glycol (hereinafter referred to as "glyme") and the dimethyl ether of diethylene glycol (hereinafter referred to as "diglyme").

The product II is then hydrolyzed in acidic medium of which the reaction scheme is assumed to be:

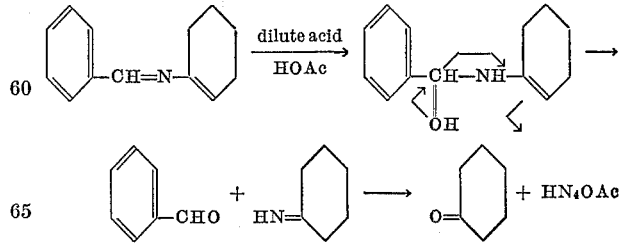

An important advantage of the present invention is that the reduction is confined to the ethylenic double bond which stands in conjugation with the carbonyl group, and that the reduction is also sterospecific. When more than one double bond stands in conjugation with the carbonyl, the terminal double bond, i.e., the one most remote from the carbonyl, is reduced.

An attractive feature in using benzylamine is that benzaldehyde is one of the reaction products obtained together with the reduced carbonyl compound.

In the reaction to prepare the Schiff base it is preferred to use about 1.3 moles of amine per mole of the carbonyl compound. Less than 1 mole of amine results in an incomplete reaction while more than 3 moles has a tendency to give addition across double bonds instead of reaction solely at the carbonyl group.

In this preparation of the Schiff base, an inert solvent, e.g., benzene, is conveniently used.

In the second stage of the reaction according to the invention, i.e., the conversion of the Schiff base, the organic alkaline catalyst is used in an amount from 0.001 to 1 mole per mole of Schiff base. More than 1 mole starts to have a deleterious effect to the yield of the reaction.

Specific embodiment

The following examples are illustrative for the present invention.

EXAMPLE I

This example shows the reduction of d-carvone to dihydrocarvone.

(a) Preparation of a Schiff base of d-carvone

A mixture of 50 g. (0.33 mole) of d-carvone, 54.5 ml. (0.5 mole) of benzylamine and 2 g. of a strongly acidic sulfonated styrene divinylbenzene cation exchange resin (trademark, Dowex 50) in the acid form in 250 ml. of benzene was refluxed with 90 g. of dry molecular sieves, such as Linde 4A (i.e., small hollow cylinders of clay), for 18 hours. The reaction mixture was then cooled and filtered. The filtrate was concentrated and then distilled. 44.7 g. of the Schiff base, boiling at 118–120° C./0.05 mm., were obtained. Yield 51% of theoretical yield.

(b) Rearrangement of the Schiff base and hydrolysis

A solution of 20 g. (0.084 mole) of the Schiff base and 0.93 g. (0.0084 mole) of potassium t-butoxide in 70 ml. of dry diglyme was stirred under nitrogen for ½ hour at room temperature. Then under continued stirring were added 30 ml. of 50% acetic acid. The stirring was continued for another 20 minutes after completion of the addition. The resulting yellow solution was diluted with 800 ml. of water and extracted three times with each time 130 ml. of petroleum ether. The combined ether extract was washed with aqueous sodium bicarbonate and saturated sodium chloride solution, then dried over anhydrous magnesium sulfate, concentrated and distilled under reduced pressure. The product had a boiling point of 90°–92° C./15 mm. and was obtained in a yield of 75% of the theoretical. The product was identified as being 5-isopropenyl-2-methylcyclohexenone or dihydrocarvone by melting point determinations of the 2,4-dinitrophenylhydrazone derivative of the product alone and in admixture with that of dihydrocarvone.

EXAMPLE II.—REDUCTION OF ISOPHORONE

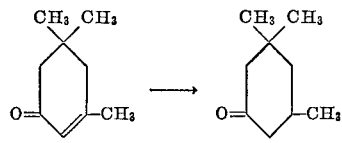

(a) Preparation of the Schiff base of isophorone

A solution of 30 g. (0.218 mole) and 47.5 g. (0.436 mole) of benzylamine in 200 ml. of benzene was refluxed with 2.0 g. of Dowex 50 (acid form) for 22 hours, the water being removed with a Dean-Stark water separator. During this period 4 ml. of water was removed. The reaction mixture was cooled, filtered and the filtrate concentrated and distilled under reduced pressure, collecting 37.3 g. of the desired product, B.P. 115–120°/0.05 mm.; yield: 75%.

(b) Rearrangement of the Schiff base and hydrolysis

A mixture of 8.0 g. (0.0352 mole) of the above Schiff base and 0.394 g. (0.00352 mole) of anhydrous potassium t-butoxide was heated on a steam bath for 18 hours under nitrogen. The reaction mixture was cooled and its solution in 20 ml. of diglyme treated with 5 ml. of aqueous acetic acid for ½ hour. The resulting solution was diluted with 50 ml. of water and extracted with petroleum ether. The extract was washed with aqueous sodium bicarbonate solution, dried over anhydrous magnesium sulfate, concentrated and distilled affording 3.2 g. of dihydroisophorone, B.P. 95–102°/15 mm.; yield: 67%.

EXAMPLE III.—REDUCTION OF 10β-METHYL-OCTALONE-2

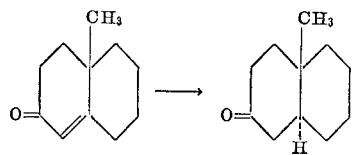

(a) Preparation of the Schiff base of 10-methyl-octalone-2

A solution of 8.0 g. (0.05 mole) of 10-methyl-octalone-2, 15.6 g. (0.15 mole) of benzylamine and 2.0 g. of Dowex 50 (acid form) in 150 ml. of benzene was refluxed for 18 hours, water being separated with a Dean-Stark water separator. During this period ~1 ml. of water was removed. The reactio mixture was cooled and filtered. The filtrate was concentrated and distilled under reduced pressure collecting 8.1 g. of the desired product, B.P. 151–153°/1.5 mm.; yield: 64%.

(b) Rearrangement of the Schiff base and hydrolysis

A mixture of 1.25 g. of the above Schiff base and 0.056 g. of potassium t-butoxide (anhydrous) was heated at 135° for 18 hours in an atmosphere of nitrogen. The reaction mixture was cooled and its solution in 15 ml. of diglyme was stirred with 5 ml. of 50% aqueous acetic acid. Water was added, and the resulting solution extracted with petroleum ether. The organic extract was washed with aqueous sodium bicarbonate solution, dried over anhydrous magnesium sulfate and concentrated. The gas liquid phase chromatography of the product showed the formation of only the trans-isomer of 10β-methyldecalone-2 in 79% yield.

EXAMPLE IV.—REDUCTION OF 3,5-DIMETHYL-Δ²-CYCLOHEXENONE

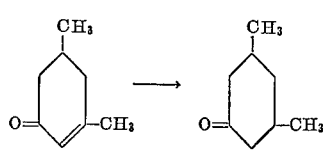

(a) The preparation of the Schiff base of 3,5-dimethyl-Δ²-cyclohexenone

A mixture of 15 g. (0.12 mole) of 3,5-dimethyl-Δ²-cyclohexenone, 25 g. of benzylamine (0.24 mole) and lg. of Dowex 50 (acid form) in 100 ml. of benzene was refluxed for 1 hour during which time theoretical amount of water was separated with a Dean-Stark water separator. The solution was cooled and filtered. The filtrate was concentrated and distilled under reduced pressure collecting 18.4 g. of the desired product, B.P. 123–125°/1.5 mm.; yield: 72%.

(b) Rearrangement of the Schiff base and hydrolysis

A mixture of 10.6 g. (0.05 mole) of the above Schiff base and 0.56 g. (0.005 mole) of anhydrous potassium t-butoxide was heated at 138° for 42 hours, under nitrogen. The reaction mixture was cooled and its solution in 20 ml. of diglyme treated with 20 ml. of 50% aqueous acetic acid for ½ hour. After the usual workup, 3.7 g. of the desired product, B.P. 75°/15 mm.; yield: 53%.

EXAMPLE V.—REDUCTION OF 3,4-DIMETHYL-Δ²-CYCLOHEXENONE

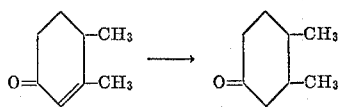

(a) Preparation of the Schiff base of 3,4-dimethyl-Δ²-cyclohexenone

A solution of 15.0 g. of 3,4-dimethyl-Δ²-cyclohexenone, 19.4 g. of benzylamine and 2 g. of Dowex 50 (acid form) in 100 ml. of benzene was refluxed for 6 hours. During this time ~2 ml. of water was removed with a Dean-Stark water separator. The reaction mixture was cooled, and filtered. The filtrate was concentrated and distilled under reduced pressure, collecting 11.4 g. of the desired product, B.P. 121–122°/0.9 mm.; yield: 45%.

(b) Rearrangement of the Schiff base and hydrolysis

A solution of 0.6 g. of the above Schiff base and 0.04 g. of anhydrous potassium t-butoxide in 15 ml. of dimethylsulfoxide was allowed to stand at room temperature for 64 hours under nitrogen. The solution was then stirred with 8 ml. of 50% aqueous acetic acid for ½ hour. The usual work-up afforded 0.32 g. of the desired product, B.P. 76–78°/15 mm.; yield: 90%.

EXAMPLE VI.—REDUCTION OF Δ¹⁽ᵃ⁾-2-OCTALONE

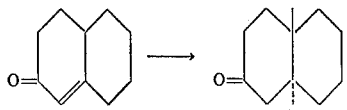

(a) Preparation of the Schiff base of Δ¹⁽ᵃ⁾-2-octalone

A mixture of 37.5 g. (0.25 mole) of Δ¹⁽ᵃ⁾-2-octalone, 40 g. (0.375 mole) of benzylamine and 1 g. of Dowex 50 (acid form) in 300 ml. of benzene was heated at reflux for 64 hours. During this time 5 ml. of water was removed by a Dean-Stark water separator. The reaction mixture was then cooled and filtered. The filtrate was concentrated and distilled under reduced pressure, collecting 34 g. of the desired product, B.P. 160–161°/1 mm.; yield: 57%.

(b) Rearrangement of the Schiff base and hydrolysis

A solution of 5 g. (.02 mole) of the Schiff base and 0.23 g. (.002 mole) of potassium t-butoxide in 25 ml. of dimethylsulfoxide was stirred under nitrogen for 16 hours. After the usual work-up 1.7 g. of the product, i.e., 2-decalone was obtained, B.P. 108°/13 mm.; yield: 60%.

We claim:

1. A process for the selective reduction of α,β-ethylenically unsaturated carbonyl compounds of the formula

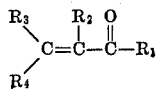

wherein $R_1$, $R_2$, $R_3$ and $R_4$ are each independently hydrogen, alkyl or alkenyl or wherein $R_1$ or $R_3$ in combination with $R_4$ is a 6-membered carbon ring, characterized in that the carbonyl compound is reacted with a primary amine to form a Schiff base, which, after isolation, is rearranged in the presence of a catalytic amount of an alkali metal alkoxide after which the rearranged product is hydrolyzed in an aqueous acidic medium.

2. Process according to claim 1, characterized in that the rearrangement is carried out in an inert atmosphere.

3. Process according to claim 1, characterized in that per mole of the carbonyl compound 1 to 3 moles of the amine is used.

4. Process according to claim 1, characterized in that the rearrangement is carried out in an inert organic solvent.

5. Process according to claim 1, characterized in that the amount of organic alkaline catalyst is from 0.001 to 1 mole per mole of Schiff base.

6. Process according to claim 1, characterized in that the carbonyl compound is an alkenal.

7. Process according to claim 1, characterized in that the carbonyl compound is a alkenone or cycloalkenone.

8. Process according to claim 1, characterized in that the carbonyl compound is d-carbone.

9. Process according to claim 1, characterized in that the carbonyl compound is isophorone.

10. Process according to claim 1, characterized in that the primary amine is benzylamine.

11. A process of preparing a Schiff base of the formula

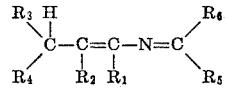

wherein $R_1$, $R_2$, $R_3$ and $R_4$ are each independently hydrogen, alkyl or alkenyl or wherein $R_1$ or $R_3$ in combination with $R_4$ is a 6 membered carbon ring and wherein $R_5$ is hydrogen, alkyl or phenyl, $R_6$ is carboxyl or

wherein $R_7$ is hydrogen or nitro, comprising reacting by contacting the compound of the formula

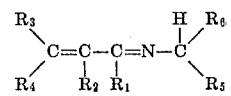

with a catalytic amount of an alkali metal alkoxide.

12. The process defined in claim 11 wherein $R_5$ is hydrogen.

13. The process defined in claim 11 wherein $R_5$ is alkyl and $R_6$ is carboxyl.

14. The process defined in claim 13 wherein $R_5$ is methyl, isopropyl or 2-methylpropyl.

References Cited

Goldberg et al.: "J. Am. Chem. Soc." vol. 77, pp. 359 to 361 (1955).

LEON ZITVER, Primary Examiner

MATTHEW M. JACOBS, Assistant Examiner

U.S. Cl. X.R.

260—397.4, 566, 586, 587, 593, 598, 601